Reissued Aug. 30, 1932 Re. 18,584

UNITED STATES PATENT OFFICE

HELENA S. SADTLER, OF ERDENHEIM, PENNSYLVANIA

METHOD OF TRANSFERRING DYESTUFFS TO FABRICS AND POROUS SURFACES

No Drawing. Original No. 1,651,470, dated December 6, 1927, Serial No. 165,755, filed February 3, 1927. Application for reissue filed December 31, 1928. Serial No. 329,658.

This is a continuation in part of my application Serial No. 23,717, filed April 16, 1925, for method of transferring dyestuffs to fabrics.

My invention relates to a method of transferring dye stuffs to fabrics—soft papers—clay or biscuit ware, etc. in fact any material that will absorb water or solvent in which the dye stuffs can be absorbed, wherein only portions of the fabric are to be dyed or decorated thus producing letterings, designs or pictures. The dyed places can be deeply dyed or only tinted, can be fugitive, fast or indelibly dyed or stained, as desired. For some purposes such as embroidery designs a fugitive marking is desirable. For imitation of block printing, permanent markings and decorative designs fastness of the dye or coloring is desired.

My method relates to the use of water soluble dyes by which they may be printed on paper in relief effects and then transferred by contact with the wetted cloth or substance. In a particular way which I will describe so that all the stages of preparing the ink, printing with the same and transferring to a wetted surface may be carried on in a commercial way or by people with little or no special skill or training.

In recent years the direct printing of fabrics has been developed owing to improvements in dyes—so that designs may be printed and then only steamed to render the colors fast. My invention includes a method of accomplishing the same results but by a different procedure. I am able to print the desired colors first on a preferably, but not necessarily, nonabsorbent paper, which has the property of readily releasing the ink deposit, and by then dusting the printed surface with a fine powder, as gum tragacanth, etc., or as disclosed in my above application, karaya gum, which gums are distinctly colloidal with cold water and only poorly or feebly soluble in cold water, and which have an advantage over gums that are readily soluble in cold water in that they more efficiently prevent "bleeding" or running of the color beyond the margins of the design during the transfer process. The powdered gums referred to permit the use of a non-drying ink on the press and the dust prevents offsetting and produces a dry surface pattern until used in contact with the wetted surface. I find that the designs can then be easily transferred by simply wetting the fabric or material to be marked and then placing the paper transfer with printed side against the wetted surface and allow the paper to remain in close contact with the wetted fabric or material for a minute or so and the entire coloring will penetrate into the wetted substance. A clear exact reproduction of markings or designs that were on the paper are now in the fabric, etc. The marking is now allowed to dry. In marking fabrics when it is desired that the color or colors selected for this purpose be fast, it is then only necessary to place a wet cloth over the transferred marking and apply a hot-iron to steam the same in other words, the selected direct colors used only require steaming to render them fast. Colors so treated will also resist dry cleaning. The carbo-hydrate powder such as tragacanth, etc. aid in the manufacturing by eliminating the offsetting and allowing sheets to be stacked and it also prevents creeping when the design is transferred to the wetted surface, thus permitting a complete transfer of the design from the paper without the application of heat or steaming.

Specifically I use what is known in the trade as paste for printing textiles or an ink with a glycerine base in which the water soluble dyes are incorporated and I generally employ a substantive dye or one that is capable of dyeing any one or all of the most used material, such as cotton, wool or silk. Mordants such as tannin or metallic salts may be incorporated into this ink. I use preferably, but not necessarily, a nonabsorbent paper, such as so called grease proof parchment paper, that is, a releasing paper, which has the property of releasing all, or practically all, of the ink deposit, using a generous supply of the above mentioned ink or textile paste. This ink surface is then dusted with a powder made from a muscilaginous gum, such as gum tragacanth, gum karay, etc., as above noted. The printed surface may have applied to it more than one ink or paste of different shades or colors, but of a kind I specify in this way, multi- or varied colored effects may be produced. I find that muscilaginous gum tends to fix the color to the spot where it is applied in character or design and it does not run when applied to the wetted material.

When the printing is performed on plate presses I use glycerine to keep the ink from drying on the press and may also use some colloidal jell jointly with it, but if cylinder presses are used, some form of thickener such as a carbohydrate that forms a colloidal jell with water which may be of gum or starch paste made of such starches as tapioca or wheat that become strongly colloidal with hot water, and the printing is done while in a heated state, is used as a medium, and the glycerine is not necessary, but the impressions are dusted as they come off the rollers with the mucilaginous gum powder. As these transfers may be used for either cotton, wool, rayon or silk, I generally use a so-called union dye which will dye any of these fabrics and I may also use some form of mordant such as tannin and metallic salt, potassium antimony tartate, etc.

When printed on cylinder and flat bed presses sufficient colloidal jell can be added to the printing medium or paste so that dusting is not required, but I prefer the dusting method because it gives a dry surface to the printing immediately and it causes the dye to more readily penetrate the wetted surface in being transferred to the different materials or substances.

I claim—

1. A transfer sheet comprising a base having printed thereon a design in water soluble ink and a coating of mucilaginous powder swelled by but not soluble in cold water and adhering to the design and partially absorbed by it.

2. A transfer sheet comprising a base having printed thereon a design in water soluble ink and a coating of powdered gum tragacanth adhering to the design and partially absorbed by it.

3. A transfer sheet comprising a base having printed thereon a design in water soluble ink in glycerin solution, and a coating of mucilaginous powder swelled by but not soluble in cold water and adhering to the design.

4. A transfer sheet comprising a base having printed thereon a design in water soluble ink and a coating of mucilaginous powder swelled by but not soluble in cold water and adhering to said design.

5. A transfer sheet comprising a paper base having printed thereon a design in water soluble ink and a coating of mucilaginous powder swelled by but not soluble in cold water and adhering to the design and partially absorbed by it.

6. A transfer sheet comprising a paper base having printed thereon a design in water soluble ink in glycerin solution and a coating of mucilaginous powder swelled by but not soluble in cold water and adhering to the design.

7. A transfer sheet comprising a base having a transferable marking thereon formed of water soluble ink and a mucilaginous gum swelled by but insoluble in cold water overlying said marking.

8. A transfer sheet comprising a base having a transferable marking thereon formed of a soluble ink and gum tragacanth.

9. A transfer sheet comprising a base having a transferable marking thereon formed of water soluble ink in glycerin solution and gum tragacanth.

HELENA S. SADTLER.